US010445815B1

(12) United States Patent
Rodaitis et al.

(10) Patent No.: US 10,445,815 B1
(45) Date of Patent: Oct. 15, 2019

(54) MAINTAINING PRIVACY OF GIFTS ON SHARED ACCOUNT

(71) Applicant: Amazon Technologies, Inc., Reno, NV (US)

(72) Inventors: Michael Francis Rodaitis, Seattle, WA (US); Jonathan Blair Norwood, Seattle, WA (US); Brian Roderick Baker, Seattle, WA (US)

(73) Assignee: Amazon Technolgies, Inc., Reno, NV (US)

( * ) Notice: Subject to any disclaimer, the term of this patent is extended or adjusted under 35 U.S.C. 154(b) by 1261 days.

(21) Appl. No.: 14/303,983

(22) Filed: Jun. 13, 2014

(51) Int. Cl.
*G06Q 30/06* (2012.01)

(52) U.S. Cl.
CPC ............................. *G06Q 30/0635* (2013.01)

(58) Field of Classification Search
CPC .................................................. G06Q 30/0635
USPC ...................................................... 705/26.81
See application file for complete search history.

(56) References Cited

U.S. PATENT DOCUMENTS

| 8,719,172 B1* | 5/2014 | Feinstein | G06F 21/10 |
| | | | 705/50 |
| 2005/0154652 A1* | 7/2005 | Bezos | G06Q 10/087 |
| | | | 705/26.62 |
| 2007/0078725 A1* | 4/2007 | Koszewski | G06Q 30/0271 |
| | | | 705/14.67 |
| 2008/0299970 A1* | 12/2008 | Roberts | G06Q 20/322 |
| | | | 455/435.1 |
| 2010/0010912 A1* | 1/2010 | Jones | G06Q 30/06 |
| | | | 705/26.1 |
| 2013/0069865 A1* | 3/2013 | Hart | H02G 11/00 |
| | | | 345/156 |
| 2015/0095214 A1* | 4/2015 | Ahn | G06Q 20/227 |
| | | | 705/39 |

OTHER PUBLICATIONS

French, Rose, Santa's Closets\ Self-Storage Units Hide Holiday Gifts, Dec. 21, 2006, The Cincinnati Post, C7, pp. 1-2. (Year: 2006).*
French, Rose, Santa's Closets\ Self-Storage Units Hide Holiday Gifts, Dec. 21, 2006, The Cincinnati Post, C7. (Year: 2006).*

* cited by examiner

*Primary Examiner* — Jason B Dunham
*Assistant Examiner* — Brittany E Bargeon
(74) *Attorney, Agent, or Firm* — Lowenstein Sandler LLP

(57) ABSTRACT

A gift privacy module receives a request to display an order history associated with a user account. In response to the request, the gift privacy module displays the order history associated with the user account, while hiding at least a portion of order details associated with at least one entry identified as private in the order history.

18 Claims, 11 Drawing Sheets

MAINTAINING PRIVACY OF GIFTS ON SHARED ACCOUNT

BACKGROUND

A large and growing population of users engages in the purchase of products or services using electronic commerce, commonly known as e-commerce or eCommerce. E-commerce generally involves the trading in products or services via computer networks such as the Internet. Modern electronic commerce typically uses the World Wide Web at least at one point in the transaction's life-cycle, although it may encompass a wider range of technologies such as e-mail, mobile devices, social media, and telephones as well.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Embodiments are described for maintaining privacy of gifts on a shared account for an electronic commerce (e-commerce) retailer. In one embodiment a gift privacy module tracks what entries in an order history are marked as private and displays those entries with at least a portion of the corresponding order details hidden. In some embodiments, one user account for the e-commerce retailer may be shared by two or more users. In such a situation, one of the users may purchase an item as a gift for another individual associated with the user account. Thus, the intended recipient may have access to the order history and be able to see the purchased item, thereby ruining the surprise. Accordingly, in one embodiment, at least a portion of the order details associated with an entry in the order history corresponding to the gift may be hidden. The gift privacy module may maintain a series of gift privacy flags associated with the entries in the order history. When a gift privacy flag is set to a specific value, it may be an indication that at least a portion of the corresponding order details should be hidden when the order history is displayed. In one embodiment, for entries that have the privacy flag set, gift privacy module may display the order date and order number, along with an indication that the item is a gift. Other order details, such as an indication of the item, a description of the item, an image of the item, and a purchase price of the item are hidden. If the user wishes to view the hidden order details, in one embodiment, gift privacy module may display a request for confirmation to display the hidden order details and once confirmation is received, may display the hidden order details.

The gift privacy module enables users of a shared e-commerce retailer account to purchase items from the e-commerce retailer as a gift for one another while maintaining an element of surprise. The gift privacy module obviates the need for these individuals to create separate user accounts for the sole purpose of keeping their purchases a secret from one another.

Figure 1:
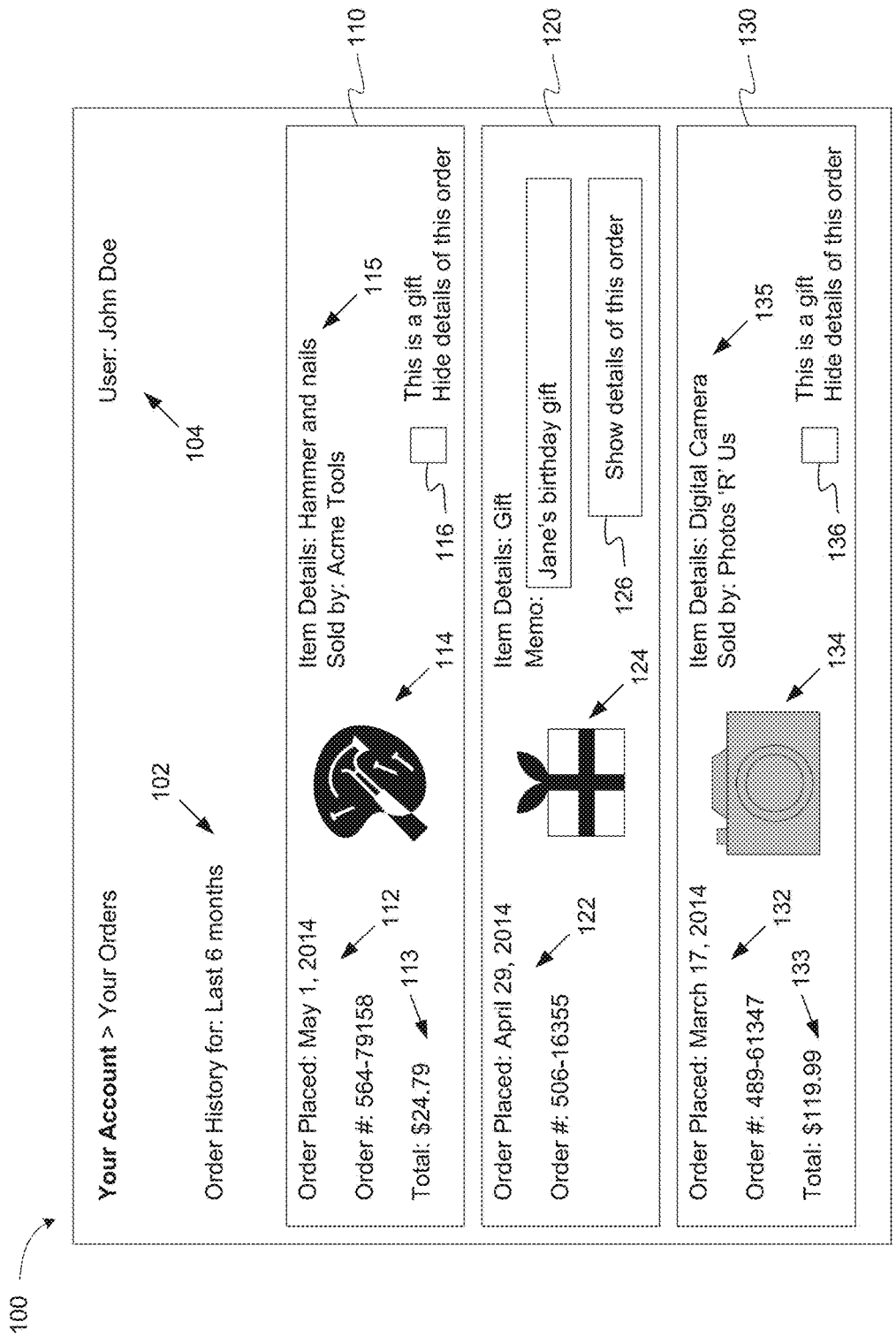
FIG. 1 is a diagram illustrating a user interface showing an order history with certain order details hidden, according to an embodiment.

FIG. 1 is a diagram illustrating a user interface showing an order history with certain order details hidden, according to an embodiment. In one embodiment, the user interface 100 displays an order history made up of a number of entries 110, 120, 130. Each of entries 110, 120, 130 includes order details corresponding to a purchase of an item from an e-commerce retailer. In the illustrated embodiment, the order history in user interface 100 contains three entries 110, 120, 130. In other embodiments however, the order history may have any number of entries corresponding to the time period 102 for which the order history is displayed. In one embodiment, the order history is associated with a user account 104 and contains entries 110, 120, 130 corresponding to purchases made using the account 104. In some embodiments, the account 104 may be associated with an individual user. In other embodiments, however, the account 104 may be shared by two or more users (e.g., spouses, co-workers, friends). In such a situation, one of the users of user account 104 may purchase an item as a gift for another individual associated with the user account 104. As such, the intended recipient may have access to the order history and be able to see the purchased item, thereby ruining the surprise. Accordingly, in one embodiment, at least a portion of the order details associated with an entry 120 in the order history corresponding to the gift may be hidden.

In one embodiment, entries 110 and 130 in the order history are normal purchases that are not intended to be gifts. As such, all of the order details for entries 110 and 130 are displayed in the order history. These displayed order details may include an order date and an order number 112, 132, a purchase price of the item 113, 133, an image of the item 114, 134, and an indication and description of the item 115, 135. In one embodiment, entries 110 and 130 further include an option 116, 136 to mark the entries as private. This option 116, 136 may take the form of a check box, radio button, pull down menu, etc. to allow a user of user account 104 to make the order details of an entry private retroactively (e.g., if they did not elect to do so at the time the order was made).

In one embodiment, entry 120 in the order history corresponds to a purchase of an item that was intended to be a gift for another individual associated with user account 104. The user that made the purchase may have opted to make the order details private at the time the order was placed. As a result, at least a portion of the order details are hidden in entry 120. In one embodiment, the order date and order number 122 are still displayed, along with an indication that the item is a gift 124. Other order details, such as an indication of the item, a description of the item, an image of the item, and a purchase price of the item, however, are hidden in entry 120. Thus, if the intended recipient of the gift is browsing the order history, the gift will not be spoiled for them. In one embodiment, entry 120 further includes a memo field that can be used to insert a memo or other message which can, for example, provide an indication or reminder, as to who or what the corresponding item is for. In one embodiment, entry 120 further includes an option 126 to reveal the hidden details of the order. Any user of user account 104 can select button 126 to reveal the hidden details. It is up to the intended recipient to exercise self-control in refraining from revealing the hidden order details and spoiling the surprise of the gift. In other embodiments, the hidden order details may be password protected with a password, pin or other security mechanism known only to the user who made the purchase. In this way, the intended recipient would not be able to access the hidden order details.

Figure 2:
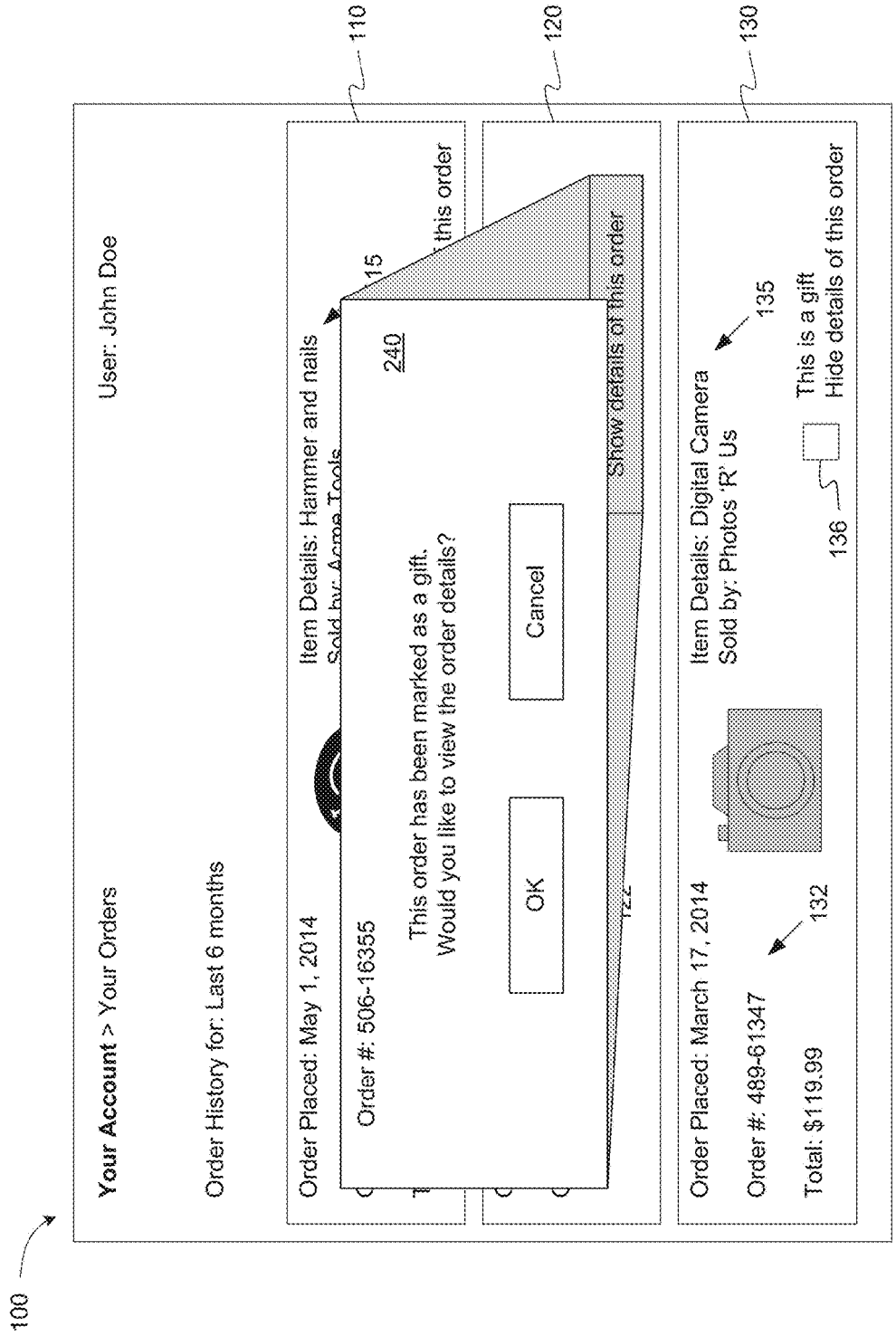
FIG. 2 is a diagram illustrating a user interface showing an order history with a request for confirmation to show hidden order details, according to an embodiment.

FIG. 2 is a diagram illustrating a user interface showing an order history with a request for confirmation to show hidden order details, according to an embodiment. In one embodiment, when a user of user account 104 is viewing the order history and selects button 126 for entry 120 in order to reveal the hidden details for the order, a confirmation dialog window 240 is displayed. The confirmation dialog window displays a request for confirmation to display the order details that were hidden. This request for confirmation gives the user a second chance to avoid spoiling the surprise of the gift in the event that they inadvertently selected button 126 to reveal the hidden order details. The user can provide confirmation by clicking the "OK" button or deny the confirmation by clicking the "Cancel" button.

Figure 3:
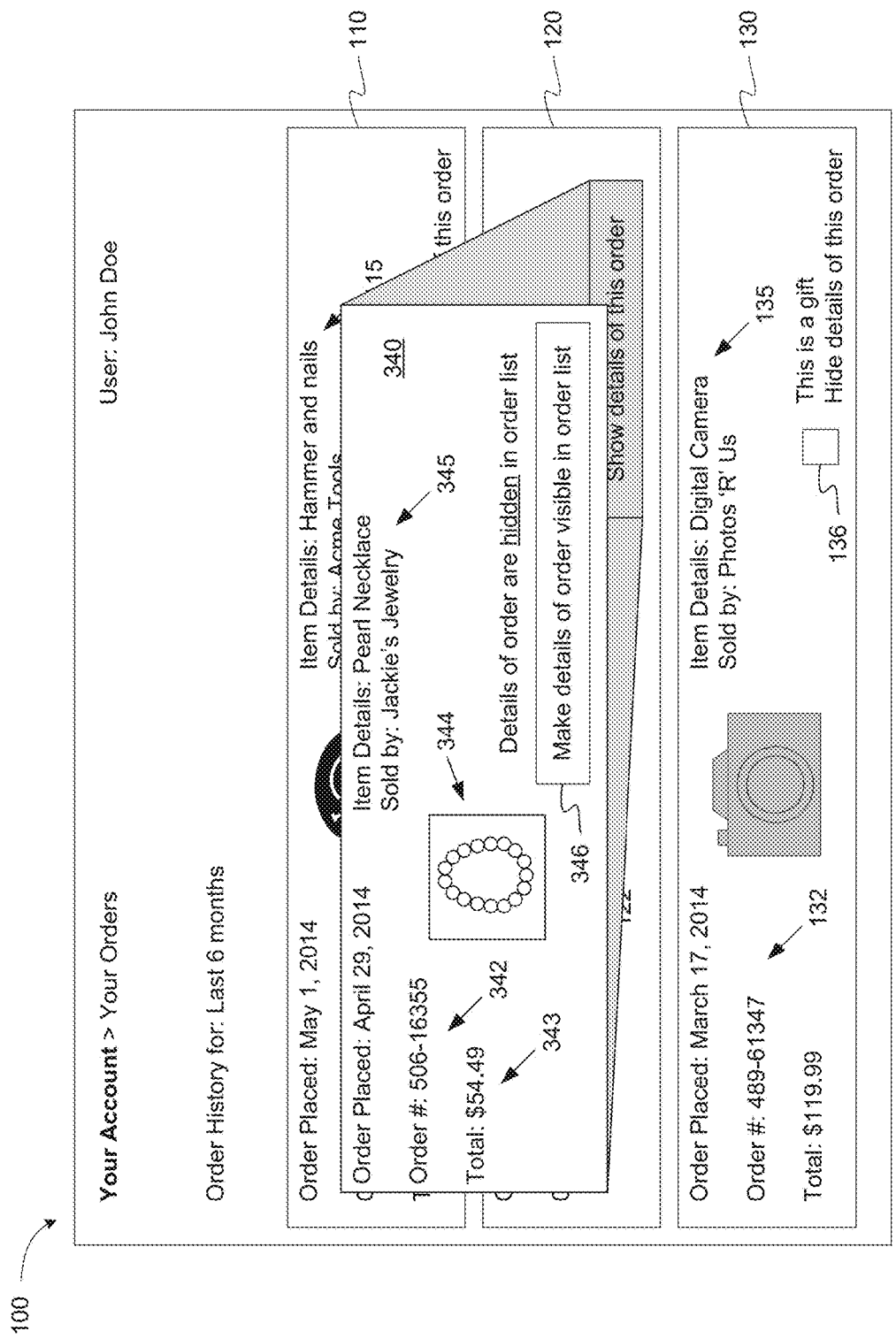
FIG. 3 is a diagram illustrating a user interface showing an order history with hidden order details revealed, according to an embodiment.

FIG. 3 is a diagram illustrating a user interface showing an order history with hidden order details revealed, according to an embodiment. In one embodiment, when a user of user account 104 is viewing the order history and selects the "OK" button in confirmation dialog window 240 in order to provide the confirmation, the hidden details for the order may be revealed and displayed in window 340. These displayed order details may include an order date and an order number 342, a purchase price of the item 343, an image of the item 344, and an indication and description of the item 345. In one embodiment, window 340 further include an option 346 to make all order details of the corresponding entry 120 visible in the order list displayed in user interface 100. This option 346 may take the form of a check box, radio button, pull down menu, interface button, etc. to allow a user of user account 104 to make the order details of an entry visible retroactively (e.g., even if they initially made the details private at the time the order was made).

Figure 4:
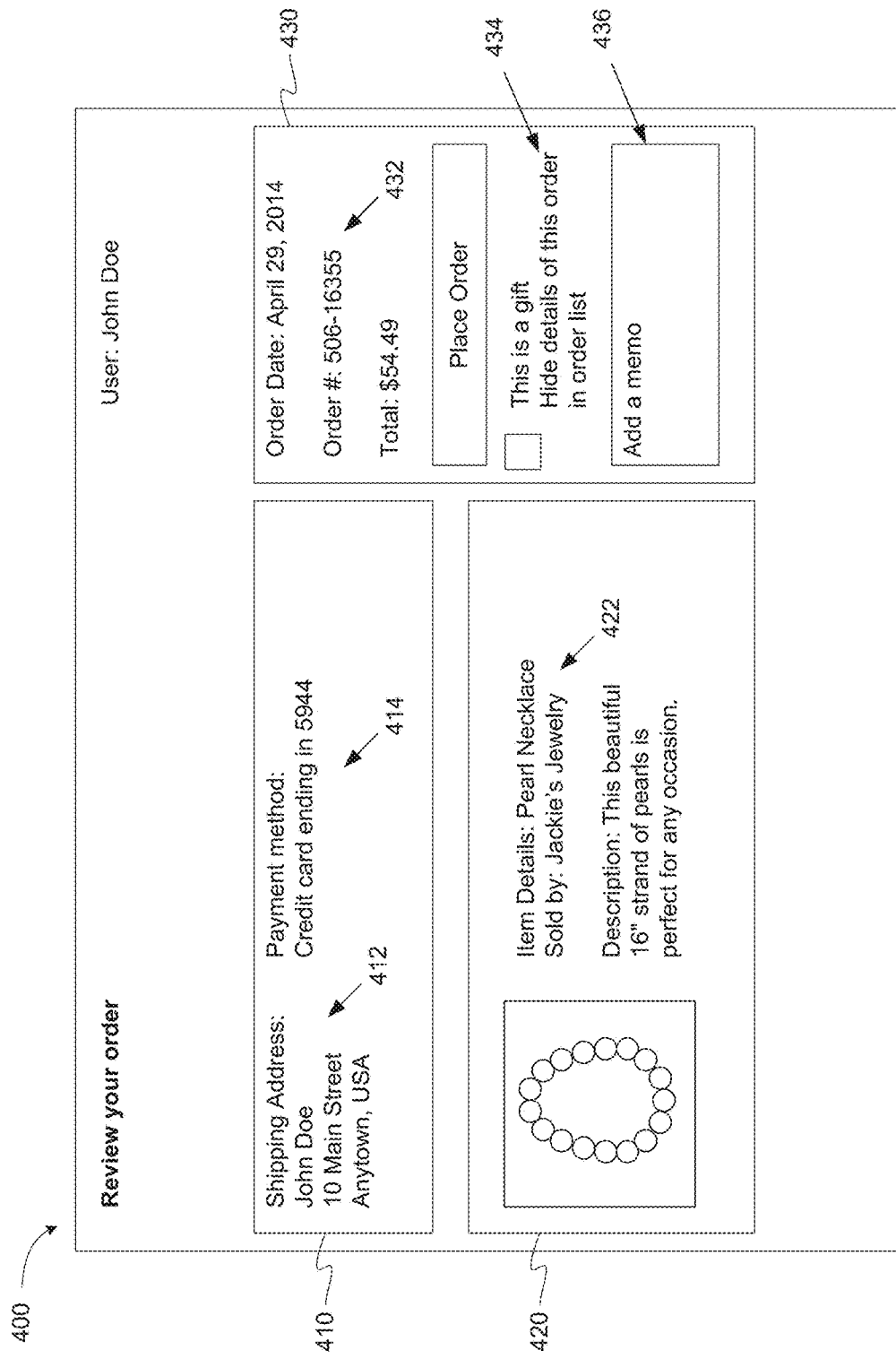
FIG. 4 is a diagram illustrating a user interface showing an order confirmation page with the option to flag the order as private in the order history, according to an embodiment.

FIG. 4 is a diagram illustrating a user interface showing an order confirmation page with the option to flag the order as private in the order history, according to an embodiment. In one embodiment, the user interface 400 displays an order confirmation page including data pieces 410, 420, 430. The order confirmation page may be displayed when a user is completing a purchase of an item from the e-commerce retailer. In one embodiment, data piece 410 includes shipping information 412 and payment information 414 and data piece 420 includes item information 422, such as an indication of the item, an indication of the seller, a description of the item and an image of the item. In one embodiment, data piece 430 includes an order date, order number and purchase price 432, and includes an option 434 to mark the order as private and a memo field 436. The option 434 may take the form of a check box, radio button, pull down menu, etc. to allow the user to make the order details of an entry private. When selected, at least a portion of the order details will be hidden when a corresponding entry 120 is displayed in the order history (as shown in FIG. 1). Memo field 436 can be used to insert a memo or other message which can, for example, provide an indication or reminder, as to who or what the corresponding item is for. The memo may be displayed in the order history, even though the order details are hidden.

In one embodiment, when a single order includes multiple items that are being purchased together in a single transaction, user interface 400 may include an individual option (similar to option 434) to mark each separate item as private or not. For example, at least one item in an order may be marked as private, while there is at least one other item in the order that is not marked as private. As a result, when the order history is displayed, as in user interface 100, there may be a separate entry for each individual item, rather than for each order, where the details of each item may be displayed or hidden according to whether the item was marked as private at the time the order was placed.

In one embodiment, user interface 400 may include an individual option (similar to option 434) to mark each piece of data for an individual item as private or not. For example, the individual options may allow the user to mark shipping information 412, payment information 414, item information 422, or order date, order number and purchase price 432 as private. As a result, when the order history is displayed, as in user interface 100, the individual pieces of information may be displayed or hidden according to whether they were marked as private at the time the order was placed.

Figure 5:
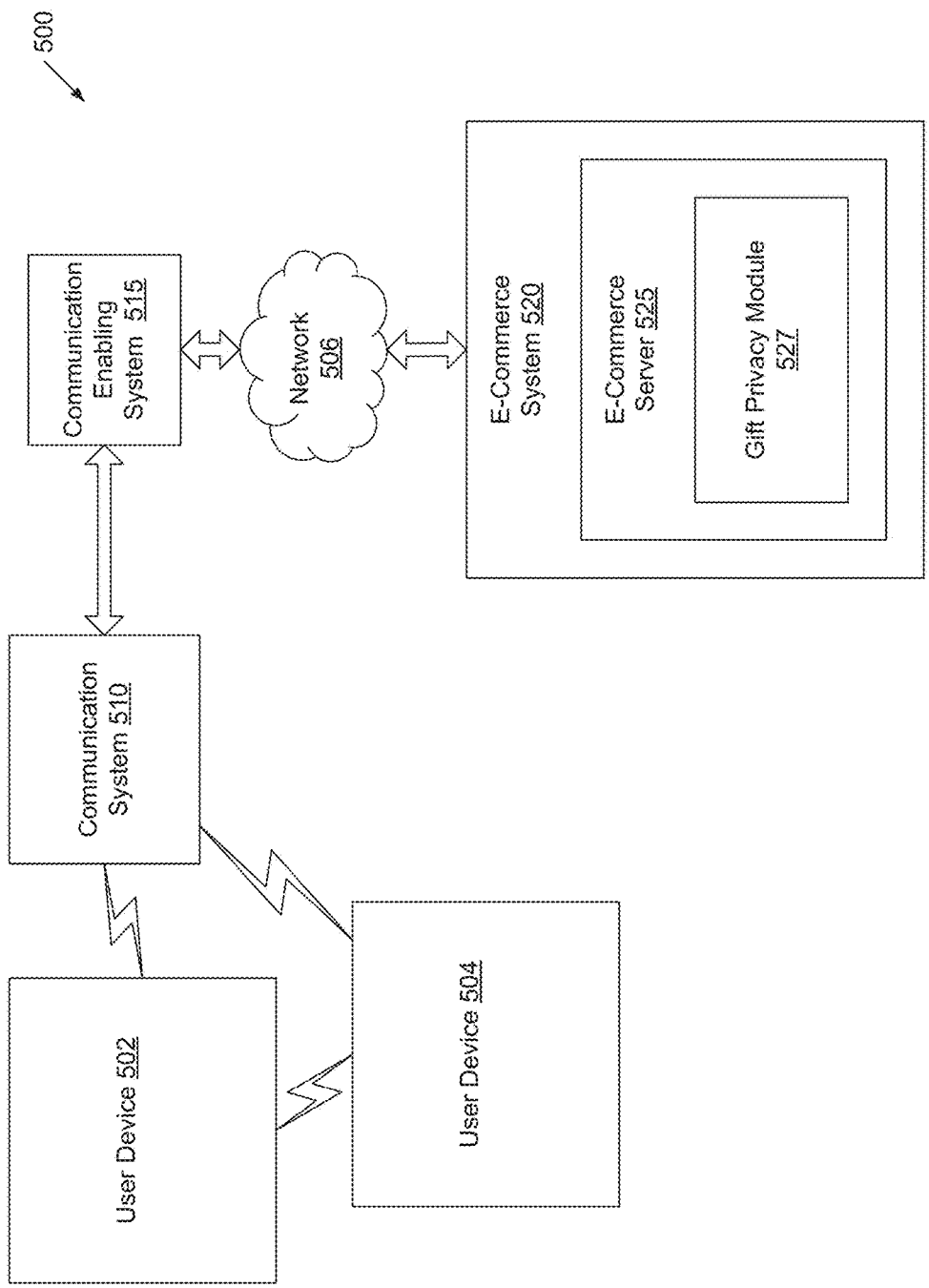
FIG. 5 is a block diagram of a network architecture, in which embodiments of the present invention may operate.

FIG. 5 is a block diagram of a network architecture 500, in which embodiments of the present invention described herein may operate. The network architecture 500 may include e-commerce system 520 and one or more user devices 502, 504 capable of communicating with the e-commerce system 520 via a network 506. Network 506 may include, for example, a public network such as the Internet or a private network such as a local area network (LAN).

The user devices 502, 504 may be portable computing devices such as electronic book readers or tablet computers. Other examples of portable computing devices include cellular telephones, personal digital assistants (PDAs), portable media players, netbooks, and the like. The user devices 502, 504 may also be non-portable computing devices such as a desktop computer, a set-top box associated with a television, a gaming console, and so on. The user devices 502, 504 are variously configured with different features to enable the shopping, browsing, purchasing, etc. of various items from e-commerce retailers.

The e-commerce system 520 may correspond to any feature or combination of features for providing items for sale to the users of user devices 502, 504. The e-commerce system 520 may include a network-accessible server-based functionality (e-commerce server 525), various data stores (not shown), and/or other data processing equipment. The e-commerce system 520 may be implemented by a single machine or a cluster of machines. The e-commerce system 520 may include one or more machines (e.g., one or more server computer systems, routers, gateways, etc.) that have processing and storage capabilities to provide the server-based functionality.

In one embodiment, the e-commerce server 525 corresponds to an entity which provides items to users for order or purchase. In this role, the e-commerce server 525 may essentially act as a retailer or the like. In other cases, the e-commerce server 525 corresponds to an entity which provides items to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

Communication between the user devices 502, 504 and the e-commerce system 520 may be enabled via any communication infrastructure. One example of such an infrastructure includes a combination of a wide area network (WAN) and wireless infrastructure, which allows a user to use the user devices 502, 504 to purchase items without being tethered to the digital content providing system 520 via hardwired links. The wireless infrastructure may be provided by one or multiple wireless communications systems, such as wireless communication system 510. In one embodiment, wireless communication system 510 may be a wireless fidelity (WiFi) hotspot connected with the network 506. Wireless communication system 510 may also be a wireless carrier system that can be implemented using various data processing equipment, communication towers, etc. Alternatively, or in addition, the wireless carrier system may rely on satellite technology to exchange information with the user devices 502, 504.

The communication infrastructure may also include a communication-enabling system 515 that serves as an intermediary in passing information between the e-commerce system 520 and the wireless communication system 510. The communication-enabling system 515 may communicate with the wireless communication system 510 (e.g., a wireless carrier) via a dedicated channel, and may communicate with the digital content providing system 520 via a non-dedicated communication mechanism, (e.g., a public Wide Area Network (WAN) such as the Internet).

In addition to wirelessly connecting to wireless communication system 510, user devices 502, 504 may also wirelessly connect to other user devices 502, 504. For example, user device 502 may form a wireless ad hoc (peer-to-peer) network with user device 504 using WiFi, Bluetooth, or other wireless communication protocols.

In one embodiment, e-commerce server 525 includes gift privacy module 527. Gift privacy module 527 may enable a user to keep at least a portion of the order details of certain orders in an order history hidden. In the situation where one of the orders corresponds to a gift purchased for another user who has access to the same user account, and thus is able to view the order history, this may enable to the gift to remain a surprise. For example, gift privacy module 527 may display certain parts of the order details, such as the order date, the order number, and an indication that the order is a gift, while keeping other parts of the order details hidden, such as an item name, item description and item purchase price. Additional details of the gift privacy module 527 are provided below.

Figure 6:
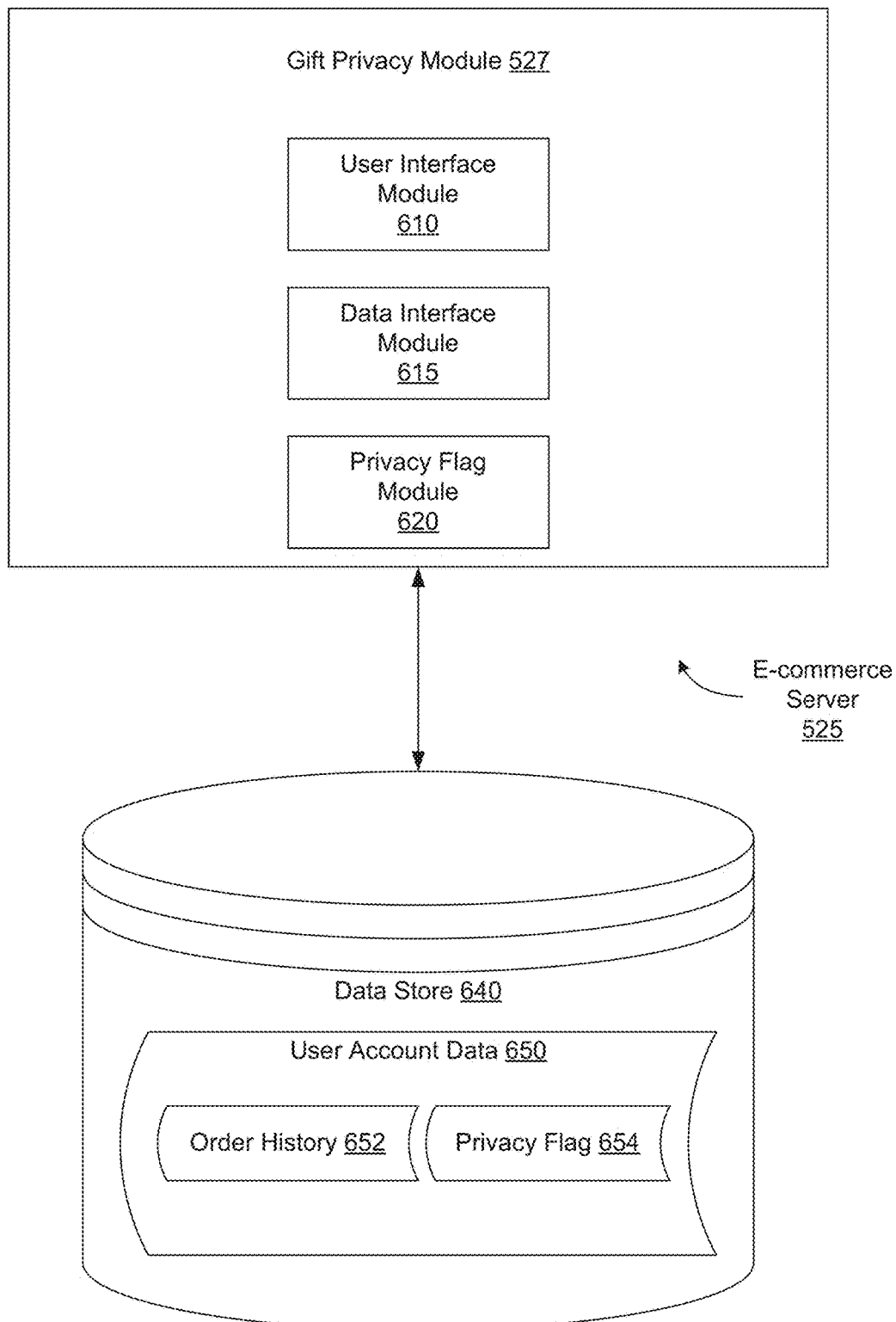
FIG. 6 is a block diagram illustrating a gift privacy module, according to an embodiment.

FIG. 6 is a block diagram illustrating a gift privacy module 527 that is included in e-commerce server 525, according to an embodiment, which may correspond to gift privacy module 527 of FIG. 5. In one embodiment, e-commerce server 525 includes gift privacy module 527, which may include user interface module 610, data interface module 615, and privacy flag module 620. This arrangement of modules and components may be a logical separation, and in other embodiments, these modules or other components can be combined together or separated in further components, according to a particular embodiment. In one embodiment, data store 640 is connected to gift privacy module 527 and includes user account data 650, which further includes order history data 652 and privacy flag data 654. In one embodiment e-commerce server 525 may include both gift privacy module 527 and data store 640. In another embodiment, data store 640 may be external to e-commerce server 525 and may be connected to e-commerce server 525 over a network or other connection. In other embodiments, e-commerce server 525 may include different and/or additional components which are not shown to simplify the description. Data store 640 may include a file system, database or other data management layer resident on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, user interface module 610 generates a user interface, such as user interfaces 100 and 400 and processes user interaction with gift privacy module 527. For example, user interface module 610 may receive a request to display an order history. In one embodiment, a user may log into their account with the e-commerce retailer through a web page or application program and select an option to view the order history. User interface module 610 may receive this request to display the order history and provide a notification of the request to data interface module 615. In addition, user interface module 610 can present the order history data 652 in the user interface. Depending on the status of the corresponding privacy flag 654, certain order details of each entry in order history data 652 may be hidden.

In one embodiment, data interface module 615 manages user account data 650 in data store 640. User account data 650 may include, for example, order history data 652, privacy flags 654, or other pieces of information associated with a user account. Order history data 652 may include data corresponding to a plurality of entries, such as entries 110, 120, 130, as shown in FIG. 1. Order history data 652 may include order details associated with each entry, such as an order date, an order number, a purchase price of the item, an image of the item, an indication of the item, a description of the item or other information. Data interface module 615 may read user account data 650 to retrieve order history 652 in response to a request from user interface module 610.

In one embodiment, privacy flag module 620 controls the reading and setting of privacy flags 654. Each entry in order history data 652 may have a corresponding privacy flag 654. Each privacy flag 654 can refer to one or more bits that are used to store a binary value or code that has an assigned meaning. In one embodiment, the privacy flags 654 have one value (e.g., a logic 1) to indicate that the corresponding entry is private and that the order details should not be displayed in the order history and a second value (e.g., a logic 0) to indicate that the corresponding entry is not private and that all order details may be displayed in the order history. In other embodiments, the flags 654 can have different or additional values and meanings. In one embodiment, there may be individual privacy flags 654 for each item in an order from order history data 652, when the order has multiple items that were purchased together in a single transaction. In another embodiment, there may be individual privacy flags 654 for each piece of information associated with an order from order history data 652, such that the information (e.g., price, item description, payment method) may be marked as private at a more granular level.

Figure 7:
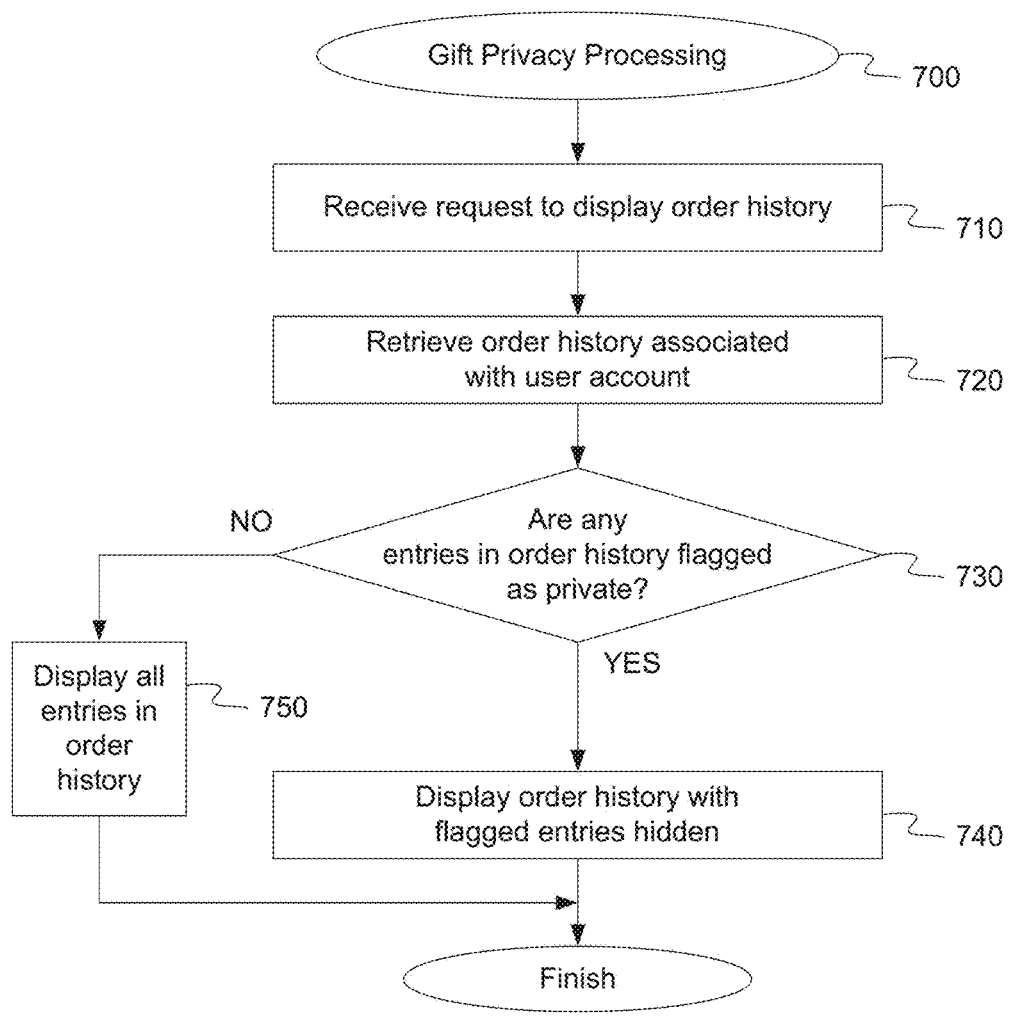
FIG. 7 is a flow diagram illustrating gift privacy processing method, according to an embodiment.

FIG. 7 is a flow diagram illustrating gift privacy processing method, according to an embodiment. The method 700 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to identify orders which are flagged or otherwise identified as private and display those orders in a user's order history with at least a portion of the order details hidden in order to maintain privacy if the order is for a gift. In one embodiment, method 700 may be performed by gift privacy module 527, as shown in FIGS. 5 and 6.

Referring to FIG. 7, at block 710, method 700 receives a request to display an order history associated with a user account for an e-commerce retailer. In one embodiment, user interface module 610 receives a request to display an order history. In one embodiment, a user may log into their account with the e-commerce retailer through a web page or application program and select an option to view the order history. User interface module 610 may receive this request to display the order history and provide a notification of the request to data interface module 615.

At block 720, method 700 retrieves the order history associated with the user account from data store 640. In one embodiment, data interface module 615 manages user account data 650 in data store 640. Data interface module 615 may read user account data 650 to retrieve order history data 652 in response to a request from user interface module 610.

At block 730, method 700 determines whether at least one entry in the order history is flagged or identified as private. In one embodiment, privacy flag module 620 controls the reading and setting of privacy flags 654. Each privacy flag 654 can refer to one or more bits that are used to store a binary value or code that has an assigned meaning. In one embodiment, the privacy flags 654 have one value (e.g., a logic 1) to indicate that the corresponding entry is private and that the order details should not be displayed in the order history and a second value (e.g., a logic 0) to indicate that the corresponding entry is not private and that all order details may be displayed in the order history. Privacy flag module 620 may read the corresponding privacy flags 654 for each entry in order history 652 to determine if any of the flags 654 are set to the value indicating that the order details should be private.

If at least one entry is flagged or identified as private, at block 740, method 700 displays the order history with at least a portion of the order details corresponding to the at least one entry hidden. In one embodiment, user interface module 610 can present the order history data 652 in the user interface. Depending on the status of the corresponding privacy flag 654, certain order details of each entry in order history data 652 may be hidden. In one embodiment, the order date and order number are still displayed, along with an indication that the item is a gift. Other order details, such as an indication of the item, a description of the item, an image of the item, and a purchase price of the item, however, are hidden in the entry. If no entries in the order history are flagged or identified as private, at block 750, method 700 displays the order history with all of the details for each entry in the order history.

Figure 8A:
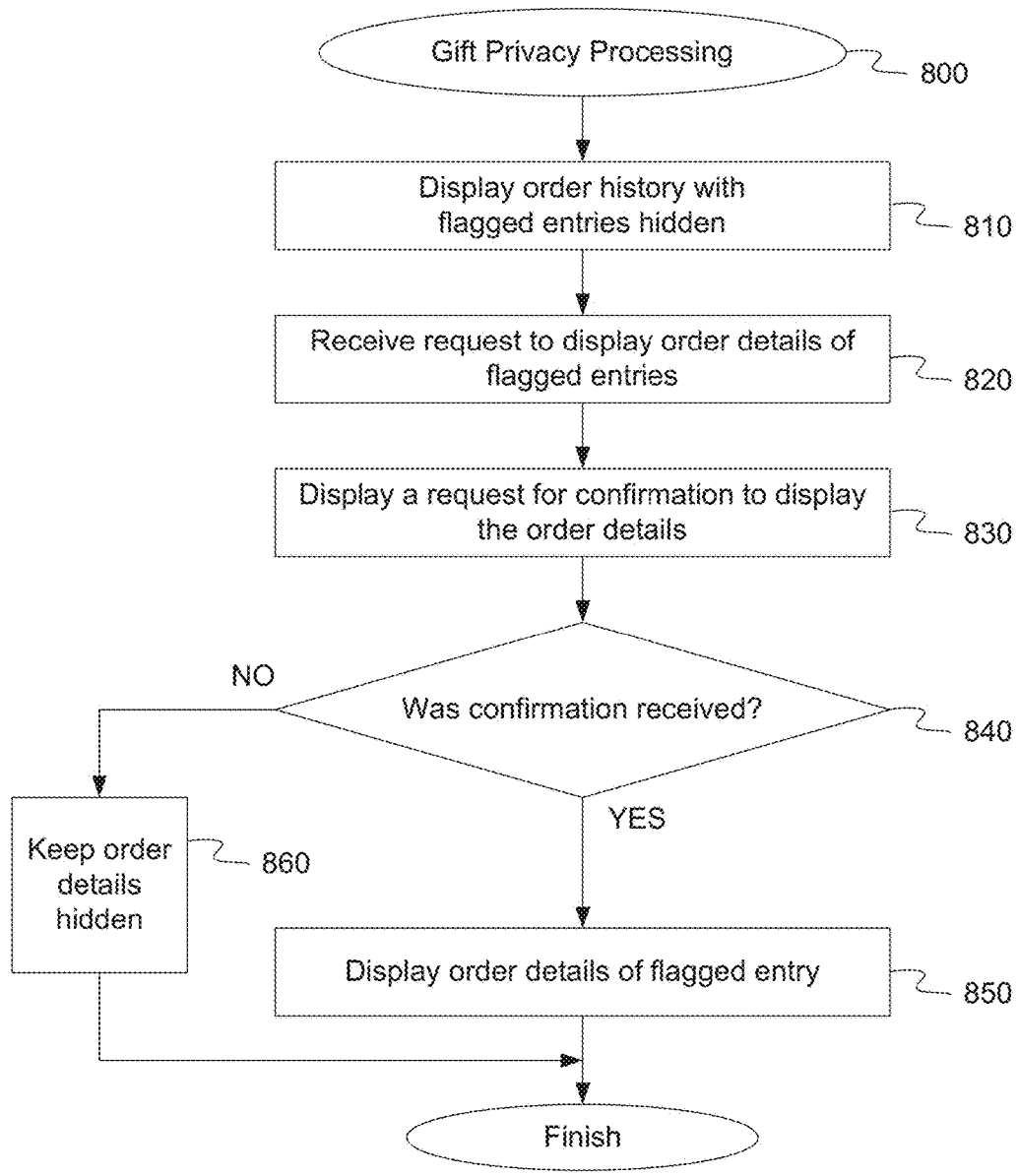
FIG. 8A is a flow diagram illustrating gift privacy processing method, according to an embodiment.

FIG. 8A is a flow diagram illustrating gift privacy processing method, according to an embodiment. The method 800 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to identify orders which are flagged or identified as private and display those orders in a user's order history with at least a portion of the order details hidden in order to maintain privacy if the order is for a gift. In one embodiment, method 800 may be performed by gift privacy module 527, as shown in FIGS. 5 and 6.

Referring to FIG. 8A, at block 810, method 800 displays the order history with order details of flagged entries hidden. In one embodiment, user interface module 610 can present the order history data 652 in the user interface. Depending on the status of the corresponding privacy flag 654, certain order details of each entry in order history data 652 may be hidden. In one embodiment, the order date and order number are still displayed, along with an indication that the item is a gift, as illustrated by entry 120 in user interface 100 of FIG. 1. Other order details, such as an indication of the item, a description of the item, an image of the item, and a purchase price of the item, however, are hidden in the entry.

At block 820, method 800 receives a request to display the order details of the at least one entry that were hidden. In one embodiment, entry 120 includes an option 126 to reveal the hidden details of the order. User interface module 610 can detect a selection of the button 126 and provide a notification to data interface module 615.

At block 830, method 800 displays a request for confirmation to display the order details that were hidden. In one embodiment, when a user is viewing the order history and selects button 126 for entry 120 in order to reveal the hidden details for the order, user interface module displays a confirmation dialog window 240. The confirmation dialog window displays a request for confirmation to display the order details that were hidden. This request for confirmation gives the user a second chance to avoid spoiling the surprise of the gift in the event that they inadvertently selected button 126 to reveal the hidden order details. The user can provide confirmation by clicking the "OK" button or deny the confirmation by clicking the "Cancel" button.

At block 840, method 800 determines whether the confirmation was received. If confirmation to display the order details is received, at block 850, method 800 displays the order details of the at least one entry that was flagged. In one embodiment, when a user of user account 104 is viewing the order history and selects the "OK" button in confirmation dialog window 240 in order to provide the confirmation, the hidden details for the order may be revealed and displayed in window 340. These displayed order details may include an order date and an order number 342, a purchase price of the item 343, an image of the item 344, and an indication and description of the item 345. If confirmation to display the order details is not received, at block 860, method 800 keeps the order details of the flagged entry hidden.

Figure 8B:
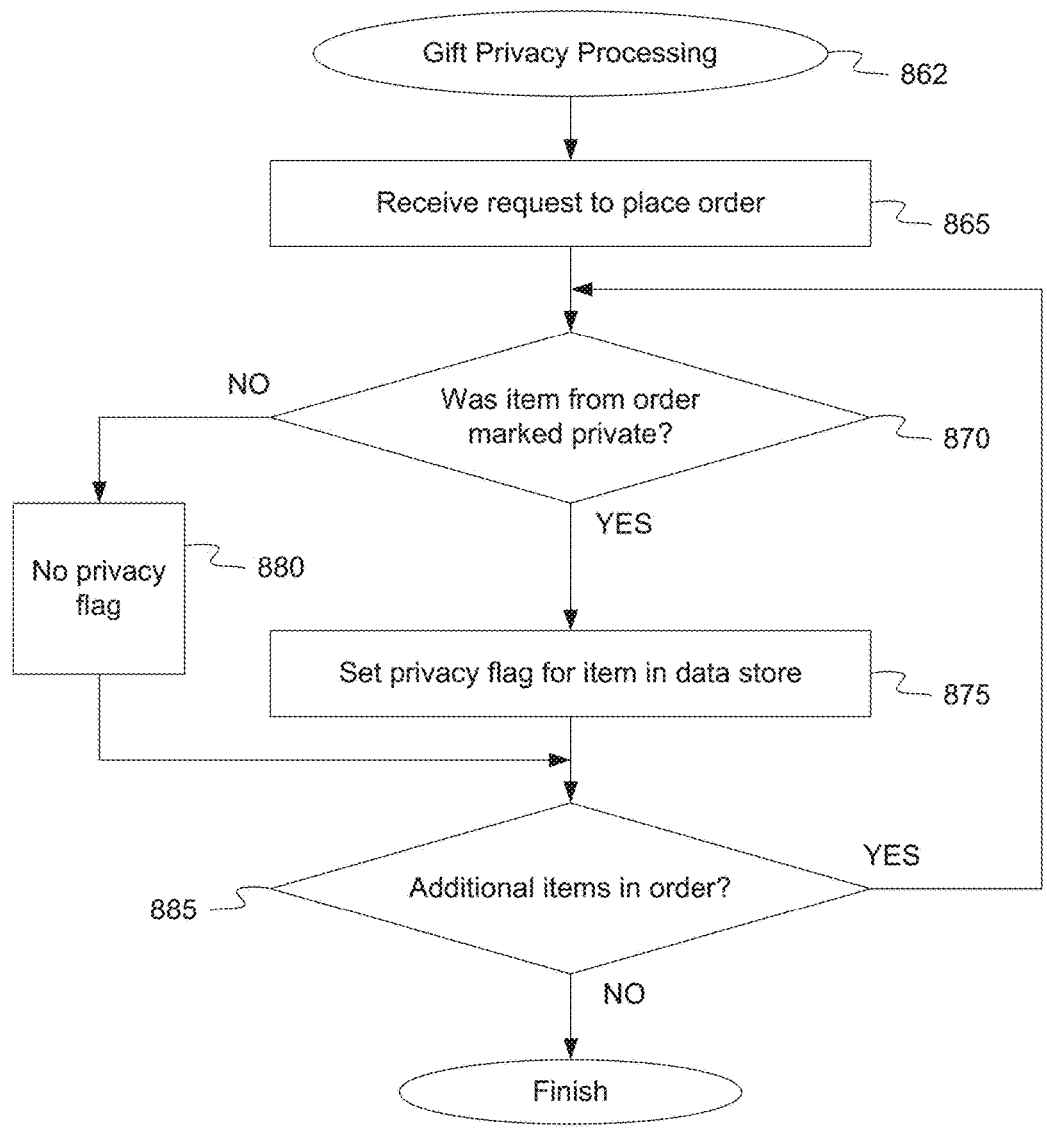
FIG. 8B is a flow diagram illustrating a gift privacy processing method, according to an embodiment.

FIG. 8B is a flow diagram illustrating gift privacy processing method, according to an embodiment. The method 862 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to determine whether an order has been requested to be made private and mark those orders as private in a data store so that at least a portion of the order details are hidden when the order history is displayed. In one embodiment, method 862 may be performed by gift privacy module 527, as shown in FIGS. 5 and 6.

Referring to FIG. 8B, at block 865, method 862 receives a request to place an order. In one embodiment, user interface module 610 presents user interface 400, through which a user selects an item for purchase from an electronic commerce retailer, provides the appropriate shipping and payment information and confirms placement of the order. In one embodiment, the order may be for a single item. In other embodiments, a single order may consist of multiple individual items, which are all purchased at the same time and during the same transaction.

At block 870, method 862 determines whether a first item from the order placed at block 865 was marked as private at the time the order was placed. In one embodiment, user interface 400 includes an option 434 to mark the order as private. The option 434 may take the form of a check box, radio button, pull down menu, etc. to allow the user to make the order details of an entry private. When selected, at least a portion of the order details will be hidden when a corresponding entry 120 is displayed in the order history (as shown in FIG. 1). In one embodiment, user interface module 610 may detect whether the option 434 was selected at the time the order was placed.

If the item was marked as private, at block 875, method 862 sets a corresponding privacy flag 654. In one embodiment, privacy flag module 620 controls the reading and setting of privacy flags 654. In one embodiment, each entry in order history data 652 may have a corresponding privacy flag 654. In the event that a single order has multiple items, there may be a separate privacy flag for each individual item to enable the order details of the individual items to be hidden. In one embodiment, for example, privacy flag module 620 may set the privacy flag 654 corresponding to the item to a value of logic 1 indicating private. If the item was not marked as private, at block 880, method 862 leaves the corresponding privacy flag 654 unset. For example, privacy flag module 620 may leave the value of the privacy flag 654 at a value of logic 0 indicating not private.

At block 885, method 862 determines whether there are any additional items in the order. For example, user interface module 610 may review the order confirmation to determine whether there were multiple items associated with the order. If there are additional items in the order, method 862 returns to block 870 and performs the operations at blocks 870-880 for each additional item in order to set the corresponding privacy flags appropriately.

Figure 9:
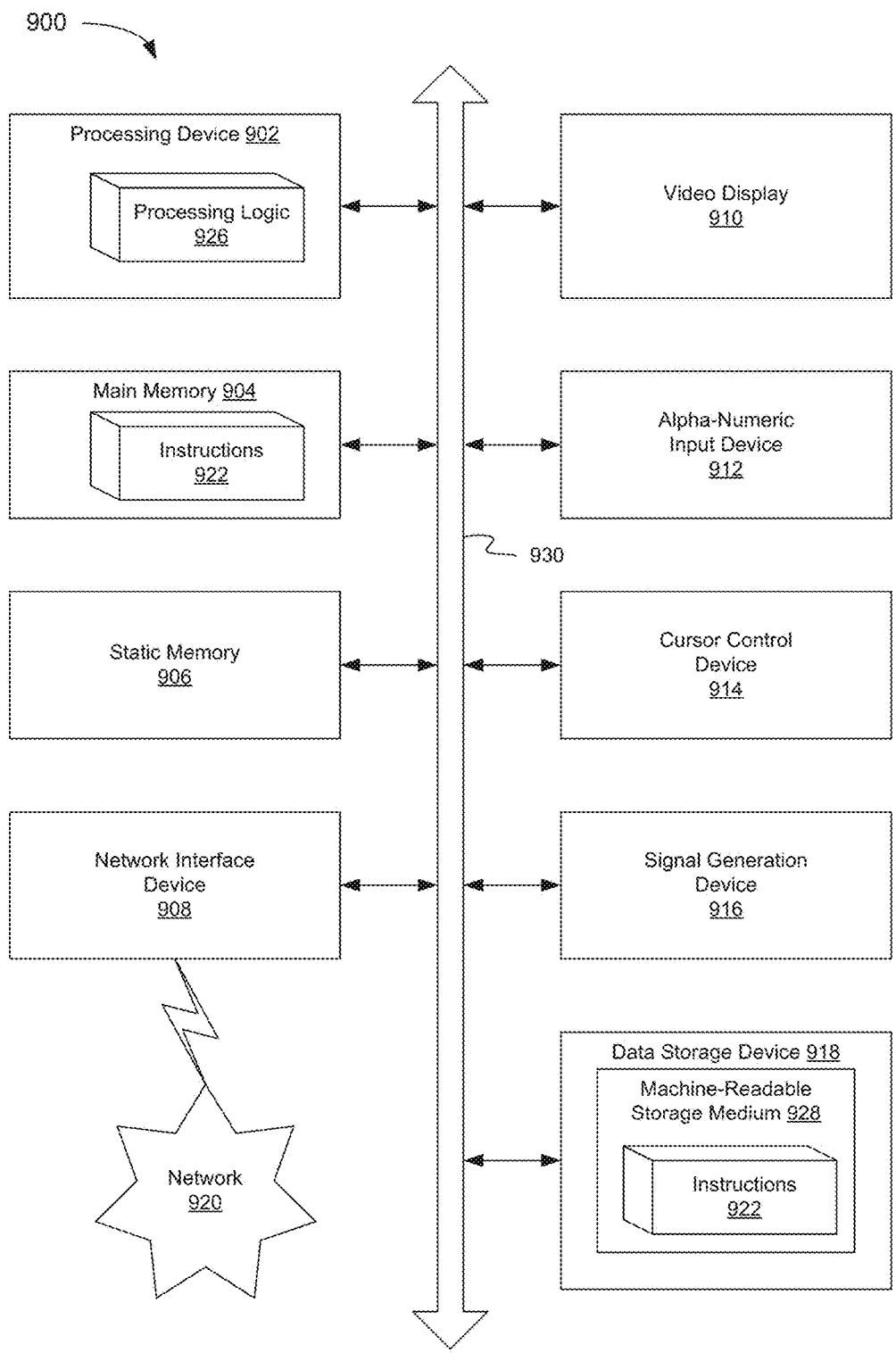
FIG. 9 is a block diagram illustrating a computer system, according to an embodiment.

FIG. 9 illustrates a diagrammatic representation of a machine in the form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may represent e-commerce server 525 of FIG. 5.

The computer system 900 includes a processing device (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute the gift privacy module 527 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable medium 928 on which is stored one or more sets of instructions 922 (e.g., instructions of gift privacy module to perform gift privacy processing) embodying any one or more of the methodologies or functions described herein. The instructions 922 may also reside, completely or at least partially, within the main memory 904 and/or within processing logic 926 of the processing device 902 during execution thereof by the computer system 900, the main memory 904 and the processing device 902 also constituting computer-readable media. The instructions may further be transmitted or received over a network 920 via the network interface device 908.

While the computer-readable storage medium 928 is shown in an embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Figure 10:
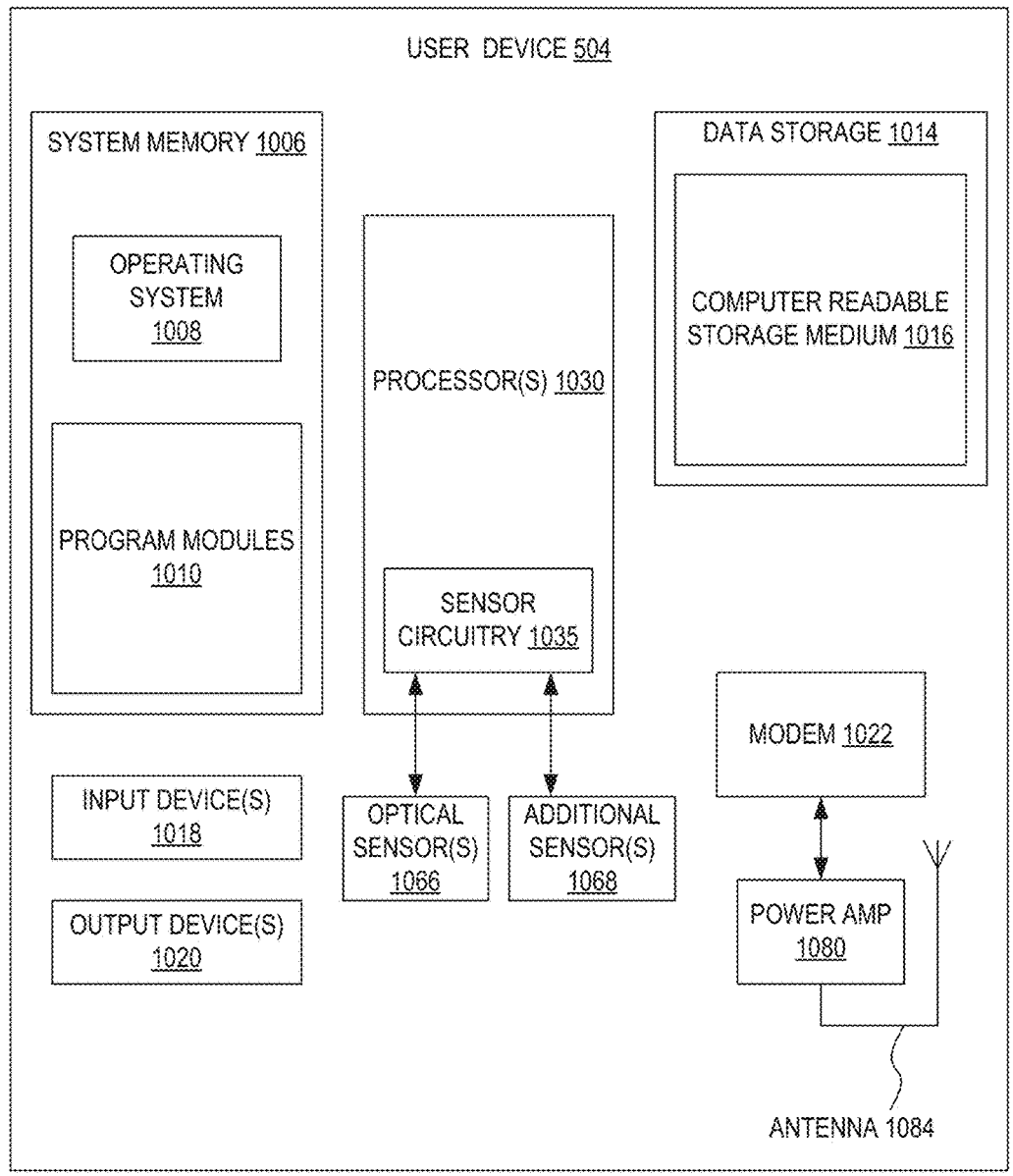
FIG. 10 is a block diagram illustrating a user device, according to an embodiment.

FIG. 10 is a block diagram illustrating a user device 504, according to an embodiment of the present invention. In one embodiment, the user device 504 may correspond to one or all of the user devices 502, 504 of FIG. 5 and may be any type of user device such as an electronic book reader, a PDA, a mobile phone, a laptop computer, a portable media player, a tablet computer, an electronic pad, a desktop computer, a camera, a video camera, a netbook, and the like.

The user device 504 includes one or more processors 1030, such as one or more CPUs, microcontrollers, field programmable gate arrays, or other types of processors. The user device 504 also includes system memory 1006, which may correspond to any combination of volatile and/or non-volatile storage mechanisms. The system memory 1006 stores information which provides an operating system component 1008, various program modules 1010, and/or other components. The user device 504 performs functions by using the processor(s) 1030 to execute instructions provided by the system memory 1006.

The user device 504 also includes a data storage device 1014 that may be composed of one or more types of removable storage and/or one or more types of non-removable storage. The data storage device 1014 includes a computer-readable storage medium 1016 on which is stored one or more sets of instructions embodying any one or more of the methodologies or functions described herein. As shown, the instructions may reside, completely or at least partially, within the computer readable storage medium 1016, system memory 1006 and/or within the processor(s) 1030 during execution thereof by the user device 504, the system memory 1006 and the processor(s) 1030 also constituting computer-readable media. The user device 504 may also include one or more input devices 1018 (keyboard, mouse device, specialized selection keys, etc.) and one or more output devices 1020 (displays, printers, audio output mechanisms, etc.).

The user device 504 further includes a wireless modem 1022 to allow the user device 504 to communicate via a wireless network (e.g., such as provided by the wireless communication system) and/or with other computing devices, such as remote computers, the e-commerce system, online book stores, electronic catalogs for libraries, and so forth. The wireless modem 1022 may allow the user device 504 to handle both voice and non-voice communications (such as communications for text messages, multimedia messages, media downloads, web browsing, etc.) with the communication system 510. The wireless modem 1022 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, etc. The wireless modem 1022 may generate signals and send these signals to power amplifier (amp) 1080 for amplification, after which they are wirelessly transmitted via antenna 1084. In addition to sending data, antenna 1084 also receives data, which is sent to wireless modem 1022 and transferred to processor(s) 1030.

In one embodiment, user device 504 includes an optical sensor 1066. The optical sensor 1066 may be a low resolution camera (e.g., having 0.2 or 0.3 Megapixels) that takes images (e.g., of a user's eyes) on a periodic basis. Alternatively, the optical sensor 1066 may have a higher resolution, such as 1 Megapixel up to 10 or more Megapixels.

In one embodiment, user device 504 includes one or more additional sensors 1068 such as a physical contact sensor, close proximity sensors, or motion sensors. The sensors 1068 can detect the presence of human body parts, and convey information regarding the detected presence to processor(s) 1030. In one embodiment, the sensors 1068 may be capacitive sensors that are configured to measure capacitance generated by the presence of the human body part using any one of various techniques known in the art. In an alternative embodiment, the sensors 1068 may also be optical (e.g., infrared) sensors that use an emitter and receiver pair to detect the presence of opaque objects. Alternatively, the sensors 1068 may be inductive sensors, which include an inductive loop. Alternatively, the sensors 1068 may be ultrasonic sensors that emit an ultrasonic signal and measure a time duration between when a signal is transmitted and the reflection of that signal received (a.k.a., flight response).

In one embodiment, the additional sensors 1068 include a motion sensor, such as an accelerometer or one or more gyroscopes. The user device 504 may use motion data from motion sensors to determine whether a user is holding the user device 504.

The processor(s) 1030 may include sensor circuitry 1035 (e.g., sensor device drivers) that enables the processor(s) 1030 to interpret signals received from the optical sensor(s) 1066 and/or additional sensors 1068. In one embodiment, the optical sensors 1066 and/or additional sensors 1068 output raw sensor data. In another embodiment, the optical sensors 1066 and/or additional sensors 1068 output fully processed signals to the processor(s) 1030. For example, the additional sensors 1068 may output a user contact/no user contact signal using a single line interface or a multi-line interface. In another embodiment, the additional sensors 1068 output, for example, positional data and/or object presence data (e.g., of a human body part) to the processors 1030 without first processing the data. In either instance, the processors 1030 may use the sensor circuitry 1035 to process and/or interpret the received data. If data is received from multiple sensors, processing the data may include averaging the data, identifying a maximum from the data, or otherwise combining the data from the multiple sensors.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely examples. Particular implementations may vary from these details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device, a request to display an order history associated with a user account for an electronic commerce retailer, the order history comprising a plurality of entries, wherein each entry in the plurality of entries comprises order details corresponding to a purchase of an item from the electronic commerce retailer;
   retrieving, by the processing device, the order history associated with the user account from a data store;
   determining, by the processing device, that at least one entry of the plurality of entries is not identified as private, wherein an entry is identified as private when the item purchased is a gift for one or more individuals associated with the user account;
   generating, by the processing device, a user interface element corresponding to the at least one entry in the order history, wherein an indication of the item, a description of the item and a purchase price of the item corresponding to the at least one entry are included in the user interface element;
   causing display of the user interface element;
   receiving an indication through the user interface element that the at least one entry in the order history is to be made private, wherein the at least one entry was not made private when an order represented by the at least one entry was made;
   setting, by the processing device, one or more bits of a privacy flag associated with the at least one entry in the data store to a first value, the first value to indicate that the at least one entry is private, wherein a second value of the one or more bits indicates that the at least one entry is not private; and
   updating the user interface element corresponding to the at least one entry to prevent the indication of the item, the description of the item and the purchase price of the item from being displayed.

2. The method of claim 1, further comprising:
   determining that a second entry in the order history is not identified as private, causing display of the order history with all of the order details for the second entry.

3. The method of claim 1, further comprising:
   receiving a request to display the order details of the at least one entry;
   causing display of a request for a confirmation to display the order details;
   receiving an indication of the confirmation; and
   causing display of the order details of the at least one entry.

4. A system comprising:
   a memory to store a gift privacy module; and
   a processing device operatively coupled to the memory, the processing device to execute the gift privacy module to:
   receive a request to display an order history associated with a user account;
   in response to the request, generate a user interface element corresponding to at least one entry the order history associated with the user account, wherein at least a portion of order details associated with the at least one entry are included in the user interface element;
   cause display of the user interface element;
   receive an indication through the user interface element that the at least one entry in the order history is to be made private, wherein the at least one entry was not made private when an order represented by the at least one entry was made;
   set one or more bits of a privacy flag associated with the at least one entry in a data store to a first value, the first value to indicate that the at least one entry is private, wherein a second value of the one or more bits indicates that the at least one entry is not private; and
   update the user interface element corresponding to the at least one entry to prevent the portion of the order details associated with the at least one entry from being displayed.

5. The system of claim 4, wherein the at least one entry in the order history corresponds to a purchase of an item from an electronic commerce retailer.

6. The system of claim 5, wherein the portion of the order details comprise an indication of the item, a description of the item and a purchase price of the item corresponding to the at least one entry.

7. The system of claim 5, wherein the at least one entry in the order history comprises a memo field to indicate a recipient of the item or a user-specified reminder related to the item.

8. The system of claim 4, wherein the processing device further to:
retrieve the order history associated with the user account from the memory in response to the request to display the order history; and
identify the at least one entry in the order history, wherein the privacy flag to indicate that an item included in the at least one entry was purchased as a gift for one or more individuals associated with the user account.

9. The system of claim 8, wherein if the at least one entry comprises a plurality of individual items, each of the plurality of individual items has a separate corresponding privacy flag to indicate whether details of a corresponding item should be included in the user interface element.

10. The system of claim 4, wherein an order number, an order date and a gift indicator of the at least one entry are still included in the user interface element when the portion of the order details associated with the at least one entry in the order history is not included in the user interface element.

11. The system of claim 4, wherein the gift privacy module further to:
receive a request to display the portion of the order details of the at least one entry;
cause display of a request for a confirmation to display the portion of the order details;
receive an indication of the confirmation; and
cause display of the order details of the at least one entry.

12. A non-transitory computer-readable storage medium storing instructions which, when executed, cause a processing device to:
receive, by the processing device, a request to display an order history associated with a user account for an electronic commerce retailer;
retrieve, by the processing device, the order history associated with the user account from a data store;
generate, by the processing device, a user interface element corresponding to the at least one entry in the order history, wherein at least a portion of order details corresponding to the at least one entry are included in the user interface element;
cause display of the user interface element;
receive an indication through the user interface element that the at least one entry in the order history is to be made private, wherein the at least one entry was not made private when an order represented by the at least one entry was made;
set one or more bits of a privacy flag associated with the at least one entry in a data store to a first value, the first value to indicate that the at least one entry is private, wherein a second value of the one or more bits indicates that the at least one entry is not private; and
update the user interface element corresponding to the at least one entry to prevent the portion of the order details associated with the at least one entry from being displayed.

13. The non-transitory computer-readable storage medium of claim 12, wherein the order history comprises a plurality of entries, wherein each entry in the plurality of entries comprises order details corresponding to a purchase of an item from the electronic commerce retailer.

14. The non-transitory computer-readable storage medium of claim 13, wherein an entry is identified as private in the order history when the item purchased is a gift for one or more individuals associated with the user account.

15. The non-transitory computer-readable storage medium of claim 13, wherein the portion of the order details comprise an indication of the item, a description of the item and a purchase price of the item corresponding to the at least one entry.

16. The non-transitory computer-readable storage medium of claim 12, wherein the instructions further cause the processing device to:
receive a request to display the portion of the order details of the at least one entry;
cause display of a request for a confirmation to display the portion of the order details;
receive an indication of the confirmation; and
cause display of the portion of the order details of the at least one entry.

17. The non-transitory computer-readable storage medium of claim 12, wherein an order number, an order date and a gift indicator of the at least one entry are still included in the user interface element when the portion of the order details associated with the at least one entry in the order history is prevented from being displayed.

18. The non-transitory computer-readable storage medium of claim 12, wherein each piece of information in the order details corresponding to the at least one entry has a separate privacy flag to indicate whether a corresponding piece of information should be included in the user interface element.

* * * * *